United States Patent
Fontana et al.

(10) Patent No.: US 11,023,984 B1
(45) Date of Patent: Jun. 1, 2021

(54) VIRTUAL PROPERTY APPRAISALS AND/OR INSPECTIONS

(71) Applicant: Wells Fargo Bank, N.A., San Francisco, CA (US)

(72) Inventors: Laura Marie Fontana, San Francisco, CA (US); Yvette Hatton, El Cerrito, CA (US); Margaret S. Honeycutt, Crockett, CA (US); Kristine Ing Kushner, Orinda, CA (US); Adnan Khan, San Francisco, CA (US); Kimberly MacInnis, San Francisco, CA (US); Jann McCully, San Francisco, CA (US); Darius A. Miranda, San Francisco, CA (US); David Newman, Walnut Creek, CA (US); Oleg Pravdin, Redwood City, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 114 days.

(21) Appl. No.: 15/492,355

(22) Filed: Apr. 20, 2017

(51) Int. Cl.
*G06Q 50/16* (2012.01)
*G06Q 30/02* (2012.01)

(52) U.S. Cl.
CPC ......... *G06Q 50/16* (2013.01); *G06Q 30/0278* (2013.01)

(58) Field of Classification Search
CPC .... G06Q 50/16; G06Q 10/20; G06Q 2220/00; G06Q 50/06; G06Q 30/0278; H04L 2209/38; H04L 9/0637
USPC .......................................... 705/306
See application file for complete search history.

(56) References Cited

U.S. PATENT DOCUMENTS

| | | | | |
|---|---|---|---|---|
| 3,928,006 A | * | 12/1975 | Martineau | B01D 46/10 96/418 |
| 7,403,838 B2 | | 7/2008 | Deen et al. | |
| 7,809,587 B2 | * | 10/2010 | Dorai | G06Q 40/08 703/6 |
| 8,046,306 B2 | | 10/2011 | Stinson | |
| 9,291,544 B1 | | 3/2016 | Boyer et al. | |
| 10,042,341 B1 | * | 8/2018 | Jacob | G01M 3/16 |
| 2003/0040924 A1 | * | 2/2003 | Spoke, III | G06Q 10/06 705/302 |
| 2006/0155571 A1 | | 7/2006 | Almeida et al. | |
| 2006/0235611 A1 | * | 10/2006 | Deaton | G01C 15/00 701/491 |

(Continued)

OTHER PUBLICATIONS

Y: Vaughan-Nichols, Steven, "Storj Introduces a Distributed Blockchain-Protected Cloud Storage Service," ZDNet.com [online], Feb. 23, 2017, available at: < https://www.zdnet.com/article/storj-introduces-a-distributed-blockchain-protected-cloud-storage-service/ > (Year: 2017).*

(Continued)

*Primary Examiner* — Richard W. Crandall
(74) *Attorney, Agent, or Firm* — Merchant & Gould P.C.

(57) ABSTRACT

A system for collecting property status information from a property for a virtual appraisal receives the property status information from a plurality of devices positioned about the property, stores the property status information in a database, and assesses the property status information to create the virtual appraisal for the property.

1 Claim, 6 Drawing Sheets

(56) References Cited

U.S. PATENT DOCUMENTS

| | | | |
|---|---|---|---|
| 2007/0143123 | A1 | 6/2007 | Goldberg et al. |
| 2014/0022281 | A1* | 1/2014 | Georgeson ............... B64F 5/60 |
| | | | 345/633 |
| 2014/0279225 | A1 | 9/2014 | Friedman |
| 2014/0279247 | A1 | 9/2014 | Leuer et al. |
| 2015/0178795 | A1 | 6/2015 | Berry et al. |
| 2016/0048934 | A1* | 2/2016 | Gross ............... G06K 9/00637 |
| | | | 705/313 |
| 2016/0098730 | A1* | 4/2016 | Feeney ............. G06Q 30/0185 |
| | | | 705/71 |
| 2016/0125481 | A1 | 5/2016 | Sicklick et al. |
| 2016/0148433 | A1 | 5/2016 | Petrovskaya et al. |
| 2016/0239921 | A1 | 8/2016 | Bray et al. |
| 2016/0260253 | A1 | 9/2016 | Reddy et al. |
| 2016/0300392 | A1 | 10/2016 | Jonczyk et al. |
| 2017/0018120 | A1* | 1/2017 | Li ........................ G06T 19/006 |
| 2017/0061351 | A1* | 3/2017 | Lee ....................... G06F 11/008 |
| 2017/0076408 | A1* | 3/2017 | D'Souza ............... G06Q 20/10 |
| 2017/0177898 | A1* | 6/2017 | Dillenberger ......... H04L 9/3236 |
| 2017/0270612 | A1* | 9/2017 | Howe ................... G06Q 40/08 |
| 2018/0034657 | A1* | 2/2018 | Brown ............... G06Q 10/0633 |

OTHER PUBLICATIONS

Higginbotham, Stacey, "Why Insurance Companies Want to Subsidize Your Smart Home," MIT Technology Review, [online], Oct. 12, 2016, available at: < https://www.technologyreview.com/s/602532/why-insurance-companies-want-to-subsidize-your-smart-home/ > (Year: 2016).*

Vaughan-Nichols, Steven, "Storj Introduces a Distributed Blockchain-Protected Cloud Storage Service," ZDNet.com [online], Feb. 23, 2017, available at: < https://www.zdnet.com/article/storj-introduces-a-distributed-blockchain-protected-cloud-storage-service/ > (Year: 2017).*

Rothfeld, Lindsay, "Tech Time Machine: The Smart Home," Mashable.com [online], archived on Feb. 8, 2015, available at: <https://web.archive.org/web/20150208055307/https://mashable.com/2015/01/08/smart-home-tech-ces/> (Year: 2015).*

Vaughan-Nichols, Steven, "Storj Introduces a Distributed Blockchain-Protected Cloud Storage Service," ZDNet.com [online], Feb. 23, 2017, available at: < https://www.zdnet.com/article/storj-introduces-a-distributed-blockchain-protected-cloud-storage-ser (Year: 2017).*

Anadiotis, George, "How to Use Blockchain to Build a Database Solution," ZDNet.com [online], Mar. 2, 2017, available at: < https://www.zdnet.com/article/blockchains-in-the-database-world-what-for-and-how/ > (Year: 2017).*

Records Keeper, archived on Feb. 9, 2017, available at: < https://web.archive.org/web/20170209195312/https://www.recordskeeper.co/ > (Year: 2017).*

Sense Homecheck, Sep. 18, 2017, < https://blog.sense.com/articles/homecheck-fault-detection-diagnostic-analysis/ > (Year: 2017).*

Tully, Jim et al., "Internet of Things Primer for 2016," Mar. 31, 2016, 8 pages.

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al, "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

\* cited by examiner

VIRTUAL PROPERTY APPRAISALS AND/OR INSPECTIONS

BACKGROUND

The process of renting or purchasing a property typically requires numerous steps, including both the financing and inspection of the property. An important part of the financing process includes the appraisal of the property's value. This is largely a manual process requiring a representative to visit the property and manually inspect any structures thereon. Likewise, the potential renters or purchasers of the property typically request one or more walkthroughs of the property at various stages of the renting and purchasing processes. This again is a manual process where the potential renters or purchasers physically visit the property.

SUMMARY

Embodiments of the disclosure are directed to systems and methods for virtual property appraisals and/or inspections.

In one aspect, a system for collecting property status information from a property for a virtual appraisal includes: at least one central processing unit; and system memory encoding instructions that, when executed by the at least one central processing unit, cause the system to: receive the property status information from a plurality of devices positioned about the property; store the property status information in a database; and assess the property status information to create the virtual appraisal for the property.

In another aspect, a method for collecting property status information from a property for a virtual appraisal includes: receiving the property status information from a plurality of devices positioned about the property; storing the property status information in a database; and assessing the property status information to develop the virtual appraisal for the property.

In yet another aspect, a method for collecting property status information from a property for a virtual appraisal includes: receiving the property status information from a plurality of devices positioned about the property; storing the property status information in a blockchain; and assessing the property status information to develop a virtual appraisal for the property based upon the blockchain.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for virtual property appraisals and/or inspections.

In some examples, property status information is collected and assessed using various computing devices positioned at the property. This property status information can be used to provide an automated understanding of the value of the property, such as during an appraisal. Further (additionally and/or alternatively), the computing devices can be used to provide an automated virtual inspection of the property, such as a walkthrough during the purchase of the property and/or an inspection during the renting of the property. Many other configurations are possible, as described further below.

Figure 1:
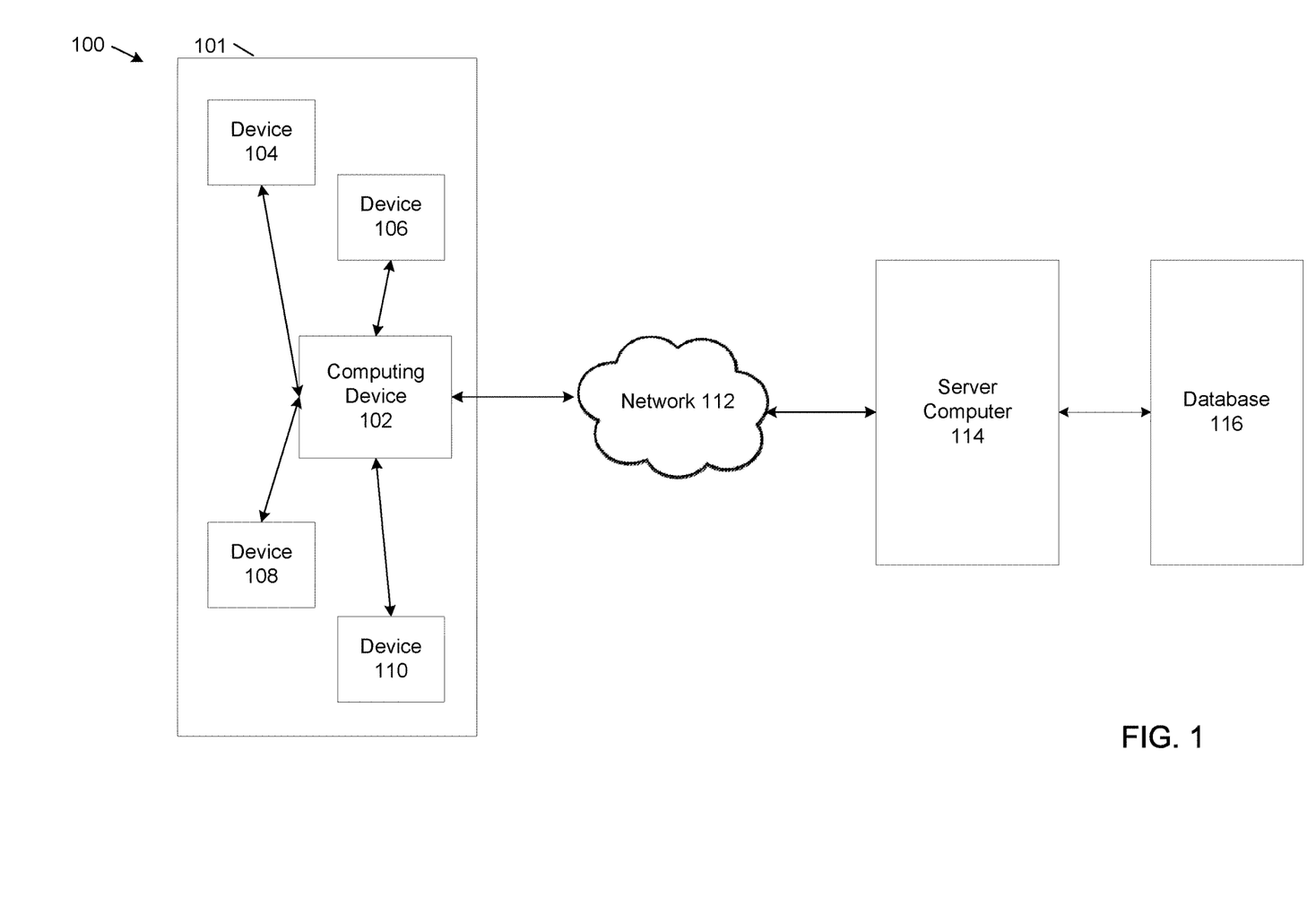
FIG. 1 shows an example system that supports virtual property appraisals and/or inspections.

FIG. 1 shows an example system 100 that provides virtual property appraisals and/or inspections for a property 101. The system 100 includes computing devices 102, 104, 106, 108, 110 positioned at the property 101, a network 112, a server computer 114, and a database 116. This is one example configuration, and many other possible configurations for the system 100 are possible.

In examples described herein, the property 101 includes land and one or more structures positioned on the land. For example, the property can include a house or office building. In other examples, the property can include a multi-dwelling building (e.g., twin-home or apartment) with two or more units. Other configurations are possible.

The example computing device 102 communicates with the devices 104, 106, 108, 110 and the server computer 114 via the network 112. In these examples, the computing device 102 can be one of various types of computing devices, like laptops, tablets, desktops, smartphones, wearables like watches, etc.

As described further below, the computing device 102 is programmed to interrogate the devices 104, 106, 108, 110 to obtain the property status information about the property. This information can be used to provide a virtual appraisal and/or a virtual inspection of the property.

The devices 104, 106, 108, 110 are positioned at various locations on the property 101 and provide the property status information about the property 101. This property status information generally includes status information about aspects of the property 101. For example, in one embodiment, one or more of the devices 104, 106, 108, 110 are sensors positioned about the property 101 to sense the operation and/or environment associated with aspects of the property 101.

These sensors can, for instance, be coupled to the major systems on the property 101, such as the heating, ventilation and air conditioning (HVAC) systems within the house on the property 101. In this example, the device 104 is a sensor coupled to the furnace of the property 101. The device 104 senses the operating conditions, use, and maintenance of the furnace and can report the same to the computing device 102. For example, the device 104 can determine how long the furnace has been run and what type of maintenance has been performed, such as the changing of furnace filters, service calls for the furnace, etc.

In other examples, other types of conditions of the property 101 can be reported by the devices 104, 106, 108, 110. For example, environmental conditions such as temperature and humidity can be reported by the devices 104, 106, 108, 110 and stored by the computing device 102 over time so that a historical record of the environment within the house on the property 101 is retained.

In other aspects, the condition of structural portions of the house (e.g., foundation, roof, etc.) on the property 101 can be reported. For example, one or more of the devices 104, 106, 108, 110 can be configured to sense problems associated with the structure, such as mold, mildew, other water encroachments, insect issues (e.g., termites), structural damage, etc.

Yet other embodiments include sensors associated with the devices 104, 106, 108, 110 that are programmed to determine a useful life remaining for various aspects of the house on the property 101, such as one or more sensors that determine wear on the shingles of a roof of the house and an estimated time until replacement is needed. In some examples, one or more of the devices 104, 106, 108, 110 can be incorporated into the elements and/or structure for which the devices 104, 106, 108, 110 are programmed to sense.

For instance, the furnace can include a sensor that is built into the furnace by the manufacturer, with the sensor being programmed to provide the needed information. In other examples, one or more of the devices 104, 106, 108, 110 can be coupled (either mechanically and/or electrically) to the desired system for monitoring thereof. For example, the devices 104, 106, 108, 110 can be positioned about the house on the property 101 to sense environmental conditions like temperature/humidity and/or be coupled to systems, like the HVAC, to receive and report data therefrom.

The devices 104, 106, 108, 110 can be programmed to communicate with the computing device 102 using wired and/or wireless communication schemes to report the status information about aspects of the property. In these instances, the devices 104, 106, 108, 110 function as Internet of Things (IoT) devices. Other configurations are possible.

The example network 112 is a computer network, such as the Internet. The various computing devices in the system 100 can be coupled (directly and/or indirectly) to the network 112 through wired or wireless mechanisms to communicate therethrough.

The example server computer 114 is a computing device of an entity, such as a financial institution, a real estate broker, or other third party. In the examples described herein, the server computer 114 can be used to request, process, and store property status information from the computing device 102 about the property 101. This property status information can be used to facilitate an automated virtual appraisal and/or a virtual inspection.

The example database 116 is a database associated with the server computer 114. The server computer 114 can query the database 116 to access and store the property status information related to the property 101. For example, as described further below, property status information regarding the maintenance of the property 101 can be obtained from the computing device 102. The server computer 114 can store this property status information in the database 116 using various methods, such as a blockchain recording system.

For instance, an example schema for a portion of a blockchain is provided below. In this example, the blockchain is used to memorialize different property status information associated with a property.

---

Begin blockchain
Property: 100 Main Street, New York City, New York 10000
Year built: 2014
Entry: 100000
Time: 2017.03.18.11:59 CDST
Sensor Type: Roof
Sensor Status: OK
Value A: In service - 5 years, 3 months, 2 days
Value B: Expected end of life - 2025.01.03
Entry: 100001
Time: 2017.03.20.09:59 CDST

---

-continued

Sensor Type: Temperature/Humidity
Sensor Status: OK
Value A: Temperature - 72 degrees F
Value B: Humidity - 99 percent humidity (note: outside acceptable range)
Entry: 100002
Time: 2017.03.22.16:09 CDST
Sensor Type: Furnace
Sensor Status: OK
Value A: Maintenance - Replacement of flame sensor
End Blockchain

---

This blockchain captures property status information about the roof of the house on the property at entry 100001. At entry 100002, the temperature and humidity in the house are captured (and the out-of-threshold humidity reading is noted). At entry 100002, the maintenance of the furnace at the property is captured. These are examples, and the blockchain can include hundreds or thousands of entries associated with different aspects of the property status information captured by the system 100.

In some examples, the contents of the blockchain is used to enforce certain aspects associated with the property 101. For example, if certain maintenance actions are required for the HVAC system by the manufacturer to maintain a warranty on the HVAC system, the blockchain can be used as proof that those actions were taken (or not taken).

In other examples, contract terms associated with renters, purchasers, or third parties on the property 101 can be captured by the blockchain. For example, if a rental contract requires a renter to replace the filter in the furnace every month, such a term can be monitored by the system 100 for compliance. In another example, if a municipality requires that maintenance be performed yearly on a sump system, these maintenance requirements can be tracked.

In yet other examples, other contract provisions relating to maintenance/up-keep/usage can be monitored and recorded in blockchain. In some examples, these terms can be incorporated into a "smart" contract that is associated with the property. The terms of the contract are managed by the system 100, and the contract can be securitized and/or traded. Many other configurations are possible.

Figure 2:
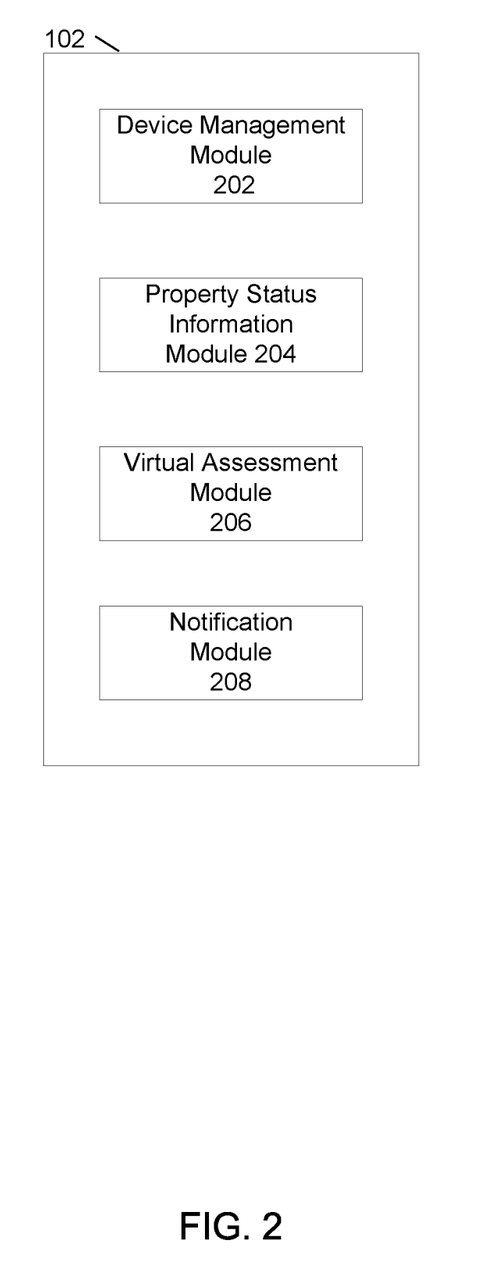
FIG. 2 shows example modules of the computing device of FIG. 1.

Referring now to FIG. 2, example logical modules of the computing device 102 are shown. These modules include a device management module 202, a property status information module 204, a virtual assessment module 206, and a notification module 208. These are just examples, and the computing device 102 can include different functionality.

The device management module 202 manages the various devices 104, 106, 108, 110 positioned about the property 101. In this example, the device management module 202 is programmed to interrogate the devices 104, 106, 108, 110 to determine a status of the devices and to obtain property status information therefrom. For example, the device management module 202 is programmed to receive information from the device 104 regarding the function of the device 104. If, for example, the device 104 malfunctions, the device management module 202 identifies the malfunction and can notify (e.g., using the notification module 208) the appropriate parties for remediation.

The property status information module 204 obtains the property status information from the devices 104, 106, 108, 110. This can include both a pull-type scenario in which the device management module 202 queries each of the devices 104, 106, 108, 110 and/or a push-type scenario in which each of the devices 104, 106, 108, 110 push the property status information to the property status information module 204. The property status information module 204 is also programmed to store relevant property status information within the database 116 using, for example, a blockchain.

The virtual assessment module 206 is programmed to provide information to one or more relevant parties, either on demand or at periodic intervals (or at predefined events).

For example, as described further below, the virtual assessment module 206 can be programmed to provide a virtual appraisal for the property 101 based upon the property status information captured by the devices 104, 106, 108, 110 and/or retained in the blockchain. The virtual assessment module 206 can interrogate the devices 104, 106, 108, 110 and/or automatically process the historical property status information in the blockchain to create a virtual appraisal for various entities, such as a property owner, realtor, financial institution, etc.

In these examples, the virtual appraisal can include much of the typical information provided in a traditional appraisal, such as the estimated market value of the property, along with other information like disclosures of significant features (number of bedrooms, bathrooms, square footage, floor plans, location maps, pictures, etc.) and issues (e.g., former flooding and other damage, etc.) associated with the house and comparable property values. Most, if not all, of the information is obtained from the property status information (as well as possibly other database stores, such as stores related to the values of comparable properties) so that the virtual assessment module 206 can automatically create the virtual appraisal with little or no manual input. In some examples, the virtual assessment module 206 generates the virtual appraisal with the same or similar information as defined in the Uniform Residential Appraisal Report.

In another embodiment, the virtual assessment module 206 is also programmed to provide a virtual inspection of the property 101. Such virtual inspections could include inspections by purchasers and/or renters of the property and/or inspections by owners of the property (e.g., when a renter leaves the property, the owner can use a virtual inspection to determine a status of the property to, for example, assess how much of a rent deposit to return). The virtual inspection allows individuals who cannot visit the property to assess aspects of the property, both visually and through the property status information captured by the property status information module 204.

In such an example, the computing device 102 can provide taped and/or live streaming of video from the property 101 to a remote location. For example, the devices 104, 106, 108, 110 can include cameras that provide virtual reality-type video so that an individual located away from the property 101 can view aspects of the property. In such a scenario, the virtual assessment module 206 can be programmed to highlight or capture video of specific areas of the property, such as area at which problems may have been identified. For example, if the HVAC of the property is not functioning, the virtual assessment module 206 is programmed to provide a video feed of the furnace and information thereabout.

In some examples, the virtual inspection is augmented so that certain features are highlighted during the inspection. For example, an augmented view can be provided so that features of the property that are normally hidden can be visualized and/or enhanced information about the property is provided. In this example, issues associated with such systems as plumbing and HVAC can be displayed, so that the inspector can have an augmented view showing portions of these systems even if positioned behind walls or other impediments. In some examples, the issues or other property status information can be highlighted on the screen during the virtual inspection, such as the display being augmented with maintenance history information about the furnace (e.g., as defined in the blockchain) when the inspector is virtually inspecting the furnace from a remote location. Other configurations are possible.

The notification module 208 is programmed to notify different entities based upon the property status information that is captured. For example, when the device management module 202 identifies that one or more of the devices 104, 106, 108, 110 is malfunctioning, the notification module 208 is programmed to notify the property owner (e.g., through visual or audible methods, such as lights, sounds, or through electronic methods like text, email, instant messenger, etc.) so that the property owner can take remedial action.

Similarly, if one or more of the devices 104, 106, 108, 110 determines that a structural aspect of the property is broken or needs maintenance, the notification module 208 is programmed to notify the appropriate entity. For example, if the HVAC system stops functioning, the notification module 208 can be programmed to notify the owner of the property 101. This might result in the owner addressing the issue without requiring any notification by the renters at the property.

In another example, if the property status information that is collected by the system 100 falls outside of expected and/or acceptable bounds (e.g., the temperature exceeds a given threshold), a notification can be sent to the property owner and/or renter. Further, offers for remediation, such as for products or services to remedy the situation, can also be provided. For example, if the furnace is malfunctioning, the notification can also include offers for new furnace products and/or service providers to service or replace the furnace. Other configurations are possible.

In yet other examples, the notification module 208 can be programmed to notify the property owner at various times with information, such as the estimated appraised value of the property based upon a virtual appraisal created by the system 100, as described herein. With such notifications, the system 100 can be programmed to provide offers to the property owner, such as a home equity line of credit based upon an increase in the equity of the property. In some examples, the system 100 is configured to communicate with a financial institution associated with the property, such as a lender, to obtain financial information associated with the property (e.g., the mortgaged amount) so that targeted offers can be provided.

Figure 3:
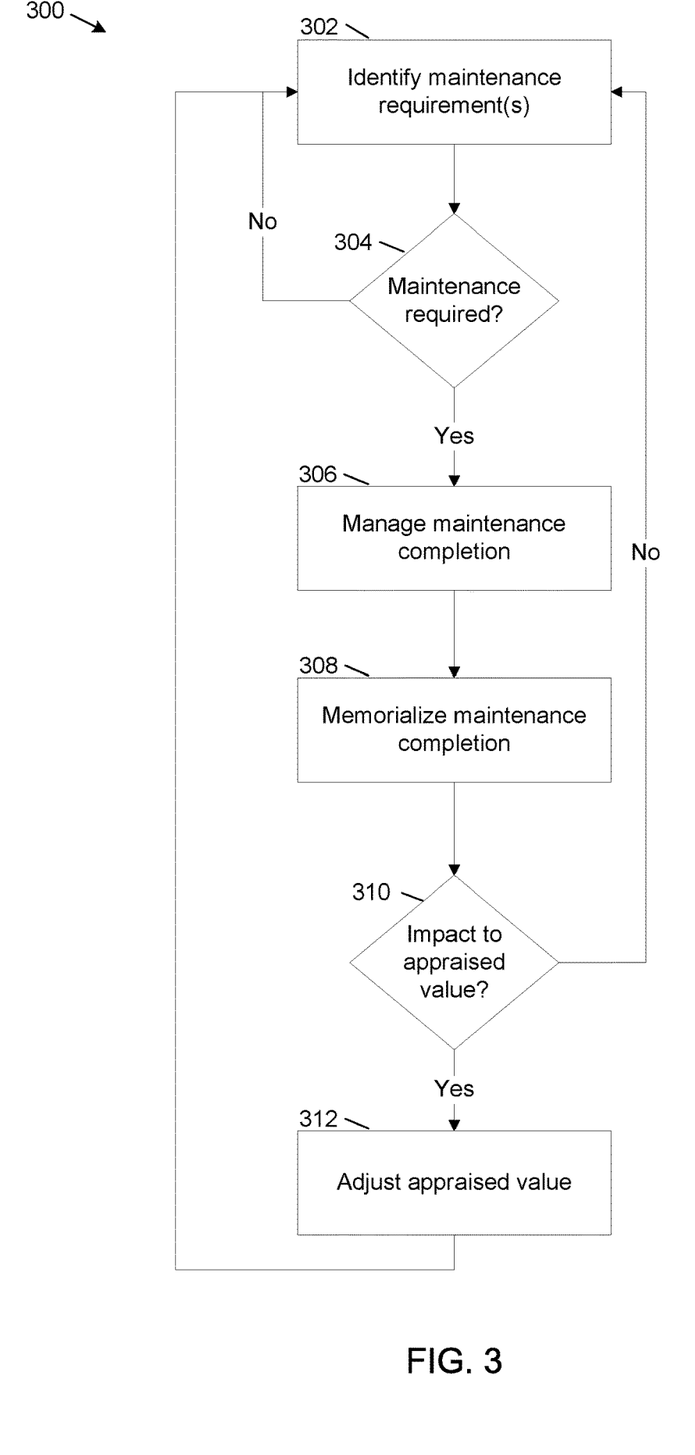
FIG. 3 shows an example method for managing maintenance requirements for a property.

Referring now to FIG. 3, an example method 300 for managing maintenance requirements for a property is shown. This is one possible use of the system 100 described above. Many other types of property status information can be monitored, captured, and/or assessed as described herein.

At operation 302 of the method 300, the maintenance requirements for the property are identified. These can include many different aspects, such as the maintenance requirements for the HVAC system, as described above.

Next, at operation 304, a determination is made whether or not maintenance is required. For example, the regular changing of filters for the furnace of the property can be tracked. If changing of the filter is needed, control is passed to operation 306; otherwise, control is passed back to operation 302.

Next, at operation 306, a determination is made regarding whether or not the required maintenance has been performed. This can include one or both of notifying that the maintenance needs to be performed and confirming that the maintenance is performed. In the example given, this can include notifying the owner or renter that the furnace filter needs to be replaced, as well as sensing that the filter has, in fact, been replaced.

Next, at operation 308, the maintenance is memorialized using, for example, the blockchain described above. In this example, the changing of the filter (e.g., date/time, etc.) is captured in the blockchain, as described further below in FIG. 4.

At operation 310 of the method 300 of FIG. 3, a determination of whether or not the maintenance activity would influence the appraised value of the property is made. If not, control is passed back to operation 302.

Otherwise, control is passed to operation 312, and the appraised value for the property is adjusted. For example, the changing of the filter for the furnace likely would not change the appraised value. However, if the HVAC system is not serviced for years or breaks, such events could influence the appraised value. If so, the value can be adjusted and possibly reported automatically to the relevant entity, such as the property owner, an insurance provider (e.g., if insured amounts need to be adjusted), a tax assessor, and/or a financial institution providing a mortgage for the property. Other configurations are possible.

Figure 4:
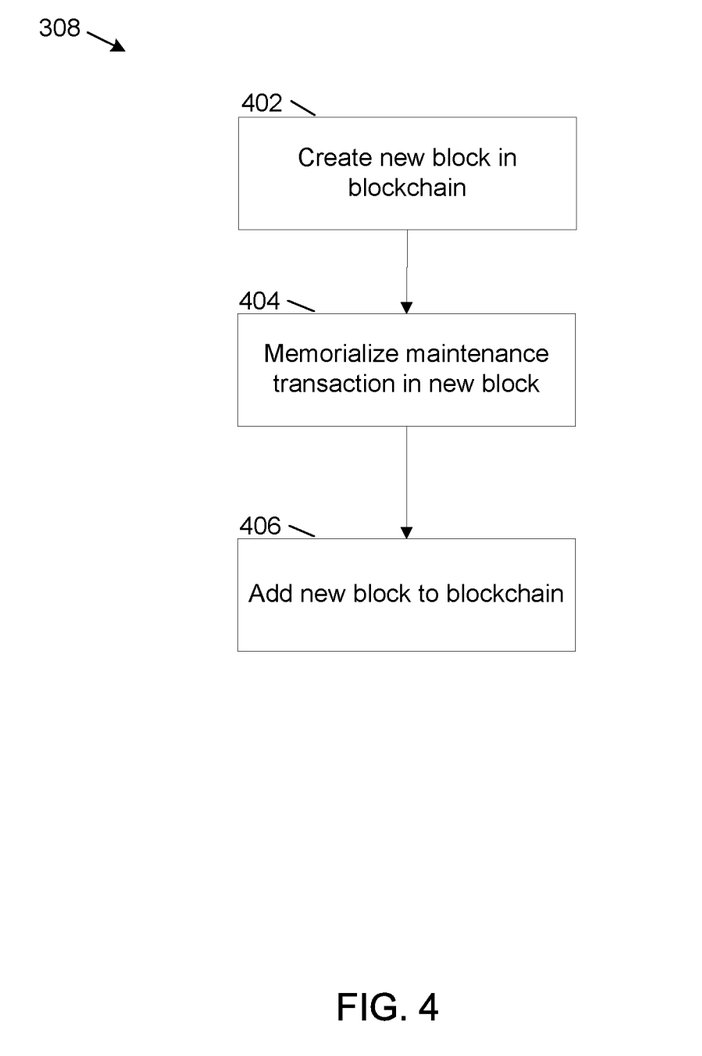
FIG. 4 shows an example method for memorializing maintenance activities for a property.

Referring now to FIG. 4, additional details are shown for the operation 308 for capturing the maintenance activity.

At operation 402, a new block in the blockchain is created. Next, at operation 404, the relevant maintenance information is captured within the new block of the blockchain. Examples of the configuration of such a blockchain are provided above. Finally, at operation 406, the new block is added to the blockchain to memorialize the property status information associated with the maintenance activity.

Although a blockchain is shown, other configurations are possible. For example, the relevant information can be captured in other data stores, such as a relational database, etc.

Figure 5:
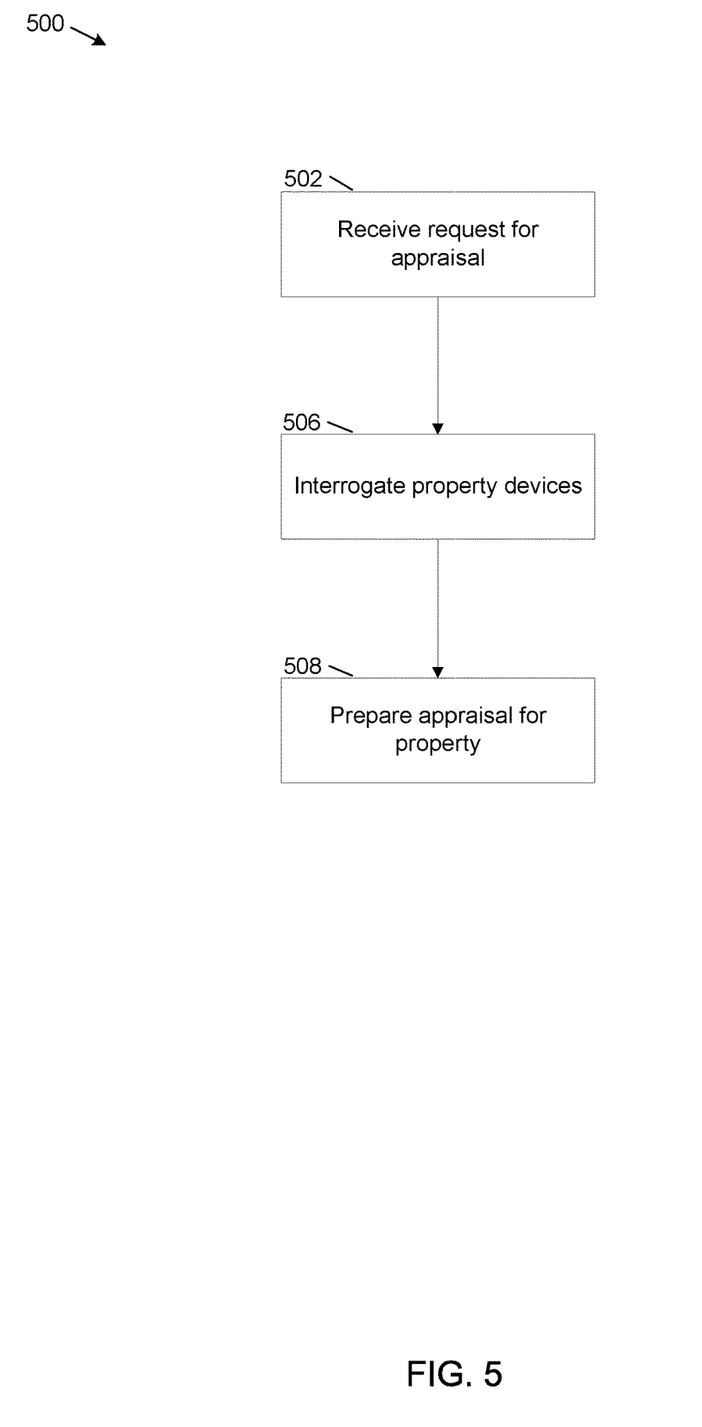
FIG. 5 shows an example method for preparing an automated appraisal for a property.

Referring now to FIG. 5, an example method 500 for creating an automated appraisal is shown.

At operation 502, a request for an appraisal is received. This request can come from various entities, such as the property owner, the property purchaser, and/or the financial institution providing funds for a mortgage on the property.

Next, at operation 506, the devices associated with the property can be interrogated, if needed, to obtain the necessary property status information. In some example, the property status information is already contained in the blockchain, so operation 506 is not necessary. In other examples, some of the property status information can be refreshed and/or obtained as needed.

Finally, at operation 508, the virtual appraisal is prepared. This can be accomplished through the semi- or fully-automated process of reviewing the property status information, such as that stored in the blockchain for the property. For example, the computing device (e.g., computing devices 102, 114) can be programmed to process the property status information (along with possible other information, such as that from government records and other third party databases) and determine an appraised value.

The example systems and methods described herein can be advantageous because the computing devices can more efficiently manage the different aspects of a property. Further, the computing devices are uniquely configured to capture property status information and store this information in a data store, such as a blockchain. Finally, the automation of the appraisal and inspection processes by the computing devices described herein transform these processes, allowing for greater efficiencies in time and accuracy.

Figure 6:
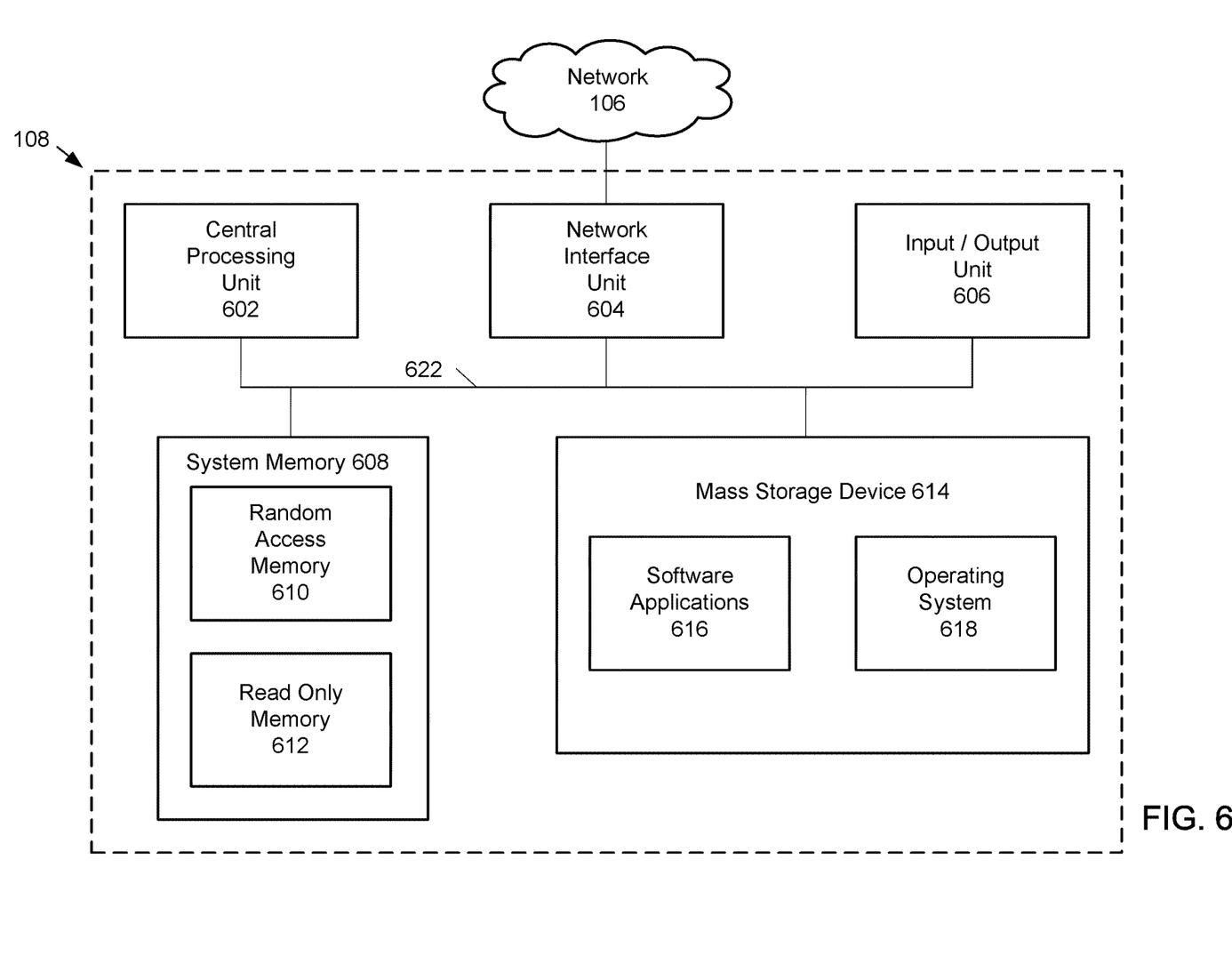
FIG. 6 shows example physical components of the computing device of the system of FIG. 1.

As illustrated in the example of FIG. 6, additional details of the computing device 102 are shown. Computing devices 104, 106, 108, 110, 114 can be configured in a similar manner.

In this example, the computing device 102 includes at least one central processing unit ("CPU") 602, also referred to as a processor, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the computing device 102, such as during startup, is stored in the ROM 612. The computing device 102 further includes a mass storage device 614. The mass storage device 614 is able to store software instructions and data. Some or all of the components of the server computer 114 can also be included in the other computing devices described herein.

The mass storage device 614 is connected to the CPU 602 through a mass storage controller (not shown) connected to the system bus 622. The mass storage device 614 and its associated computer-readable data storage media provide non-volatile, non-transitory storage for the computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

According to various embodiments of the invention, the computing device 102 may operate in a networked environment using logical connections to remote network devices through the network 112, such as a wireless network, the Internet, or another type of network. The computing device 102 may connect to the network 112 through a network interface unit 604 connected to the system bus 622. It should be appreciated that the network interface unit 604 may also be utilized to connect to other types of networks and remote computing systems. The computing device 102 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the server computer 114 can store software instructions and data. The software instructions include an operating system 618 suitable for controlling the operation of the computing device 102. The mass storage device 614 and/or the RAM 610 also store software instructions and software applications 616, that when executed by the CPU 602, cause the computing device 102 to provide the functionality of the computing device 102 discussed in this document. For example, the mass storage device 614 and/or the RAM 610 can store software instructions that, when executed by the CPU 602, cause the computing device 102 to display received data on the display screen of the computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for collecting property status information from a property for a virtual appraisal, the method comprising:

receiving the property status information from a plurality of devices positioned about the property, at least one of the devices being a sensor device coupled to an aspect of the property that monitors an operating condition, maintenance, and age of the aspect of the property to estimate a useful life remaining for the aspect of the property;

storing the property status information in a blockchain, including storing in the blockchain maintenance records for the plurality of devices positioned about the property wherein each of the maintenance records in the blockchain includes:

a sensor type identifying a type of the sensor device, the type defining the aspect of the property that is monitored by the sensor device;

a sensor status indicating if the sensor device is functioning;

an in-service value indicating how long the aspect of the property has been in service at the property; and a value indicating when a last service for the aspect of the property was performed or an end-of-life for the aspect of the property;

assessing the property status information to develop the virtual appraisal for the property based upon the blockchain;

providing a virtual inspection using one or more cameras;

providing as an augmented view during the virtual inspection one or more features of the property that are normally hidden from view including maintenance history and the property status information;

providing a first notification on the augmented view, when maintenance is required for the one or more features of the property, wherein the first notification includes a first offer of at least one service provider to service or replace the at least one feature of the property; and providing a second notification on the augmented view, when the maintenance required would affect the appraisal value, the second notification is automatically sent to a relevant entity, including a second offer of a financing option for the property from a financial institution.

* * * * *